United States Patent [19]

Häfner

[11] 4,213,536
[45] Jul. 22, 1980

[54] CONTAINER FOR CONVOLUTED WIRE OR THE LIKE

[75] Inventor: Manfred Häfner, Leopoldshöhe, Fed. Rep. of Germany

[73] Assignee: Häfner & Krullmann GmbH, Leopoldshöhe, Fed. Rep. of Germany

[21] Appl. No.: 947,735

[22] Filed: Oct. 2, 1978

[51] Int. Cl.² .............................................. B65D 25/54
[52] U.S. Cl. ................................ 220/82 R; 206/45.31;
206/407; 264/274
[58] Field of Search ............... 264/273, 274, 246, 247;
206/415, 407, 389, 45.34, 45.31; 220/82 R, 82 A; 242/129, 170, 137, 146

[56] References Cited

U.S. PATENT DOCUMENTS

| | | | |
|---|---|---|---|
| 2,172,864 | 9/1939 | Calva et al. | 220/82 R X |
| 2,482,265 | 9/1949 | Gonda | 220/82 R X |
| 2,609,570 | 9/1952 | Danielson et al. | 264/247 X |
| 2,926,485 | 3/1960 | Morin | 264/273 X |
| 3,086,245 | 4/1963 | Gits | 264/247 X |
| 3,277,562 | 10/1966 | Huguenin | 264/273 X |
| 3,355,061 | 11/1967 | Ritter | 206/389 X |
| 3,401,269 | 9/1968 | Tabet | 264/274 X |
| 3,475,530 | 10/1969 | Cooper | 264/247 X |
| 3,515,269 | 6/1970 | Furtado | 242/129 X |
| 3,831,879 | 8/1974 | Miller | 242/129 |
| 3,992,761 | 11/1976 | McElroy et al. | 264/273 X |

FOREIGN PATENT DOCUMENTS

| | | | |
|---|---|---|---|
| 2210247 | 9/1973 | Fed. Rep. of Germany | 220/82 A |
| 1140168 | 7/1957 | France | 220/82 R |

Primary Examiner—Allan N. Shoap
Attorney, Agent, or Firm—Peter K. Kontler

[57] ABSTRACT

A plastic container for storage and shipment of thin wire which is convoluted on a plastic reel has a bottom wall which is detachable from one end portion of a cylindrical barrel having windows for transparent or translucent plastic panes whose inner surfaces are flush with the inner surface of the barrel and whose edge faces are provided with tongues or grooves for complementary grooves or tongues in the edge faces bounding the respective panes. The windows are connected to each other by webs which are recessed or embedded into the material of the barrel.

7 Claims, 7 Drawing Figures

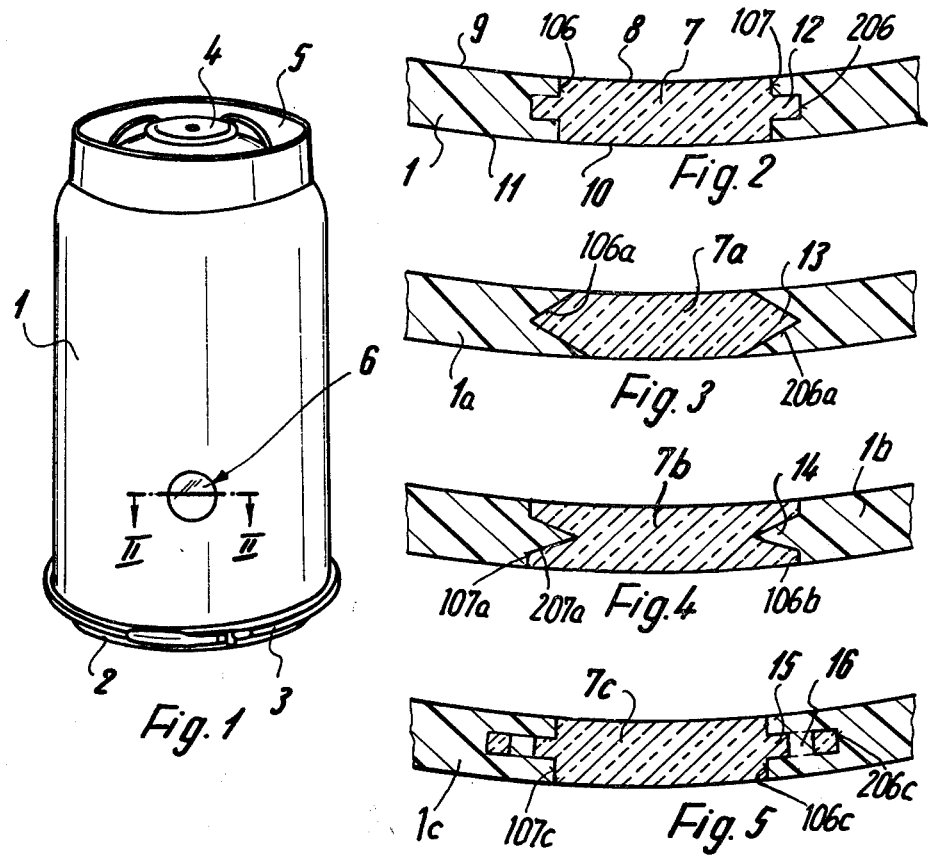
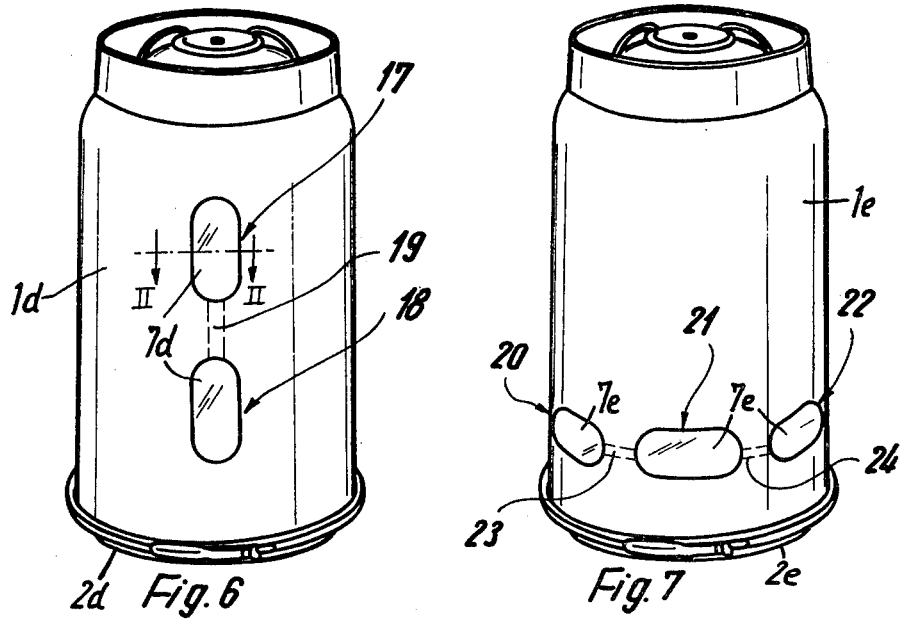

CONTAINER FOR CONVOLUTED WIRE OR THE LIKE

BACKGROUND OF THE INVENTION

The present invention relates to containers in general, and more particularly to improvements in containers which are especially suited for storage and shipment of thin wire which is convoluted on plastic reels or the like. Still more particularly, the invention relates to improvements in containers of the type wherein one end portion of a tubular section (e.g., a cylindrical barrel which preferably consists of synthetic plastic material) is connected with a bottom wall or end wall and confines the reel for convoluted material.

Heretofore known containers for storage and/or shipment of thin wire are made of opaque synthetic plastic material and the upper ends of their barrels are closed by covers or lids which are removable to allow for withdrawal of wire from their interior. A drawback of such containers is that the quantity of wire in the interior of the barrel cannot be ascertained at a glance, i.e., it is not possible to determine whether or not the reel in the container carries a full supply of convoluted wire or whether or not the supply is depleted, either completely or in part.

OBJECTS AND SUMMARY OF THE INVENTION

An object of the invention is to provide a novel and improved container, especially for storage and/or shipment of thin wire which is convoluted on a plastic reel or the like, which is constructed and assembled in such a way that the quantity of material which is confined therein can be ascertained with little or no loss in time.

Another object of the invention is to provide the container with novel and improved means for enabling a person in charge to immediately ascertain the quantity of material which is stored therein.

A further object of the invention is to provide the container with novel and improved means for retaining the observation permitting means in a section of the container.

An additional object of the invention is to provide a container wherein the provision of means which permits observation of the contents does not interfere with withdrawal of the contents from the container.

Another object of the invention is to provide a container wherein the presence, absence and/or the amount of stored material can be ascertained without opening the container, particularly without removing that part which is used to normally close or seal the opening for evacuation of the contents.

A further object of the invention is to provide a container which can be mass-produced at reasonable cost, which can be readily stacked with similar containers, and which protects and shields the contents just as well as heretofore known containers.

The invention is embodied in a container, particularly for storage and/or shipment of thin wire which is convoluted on a plastic reel or the like. The container comprises a bottom wall and a hollow tubular section including an end portion connected to or integral with the bottom wall, an inner surface, an outer surface, a window extending between the inner and outer surfaces, and an edge face bounding the window. In accordance with a feature of the invention, the container further comprises a light-transmitting (transparent or translucent) pane which preferably consists of synthetic plastic material and is installed in the window of the tubular section. The pane has an inner surface which is preferably flush with the inner surface of the tubular section, an outer surface which is preferably flush with the outer surface of the tubular section and a circumferentially extending edge face. The two edge faces have complementary male and female portions which connect the pane to the tubular section. Such male and female portions preferably constitute at least one tongue-and-groove joint with a tongue of rectangular, square, triangular or other suitable cross section provided on one of the edge faces and a complementary groove in the other edge face.

If the tubular section has several windows, each such window receives a discrete pane, and the panes can be connected to each other, e.g., by means of webs which are preferably embedded in the (preferably plastic) material of the tubular section.

The novel features which are considered as characteristic of the invention are set forth in particular in the appended claims. The improved container itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a container which embodies one form of the invention and whose tubular section has a single circular window for a light-transmitting plastic pane;

FIG. 2 is an enlarged fragmentary sectional view as seen in the direction of arrows from the line II—II of FIG. 1 or FIG. 6;

FIG. 3 is a similar sectional view showing a modified connection between the edge faces of the tubular section and the pane;

FIG. 4 is a similar sectional view showing a third connection between the edge faces of the tubular section and the pane;

FIG. 5 is a similar sectional view showing a fourth connection between the edge faces of the tubular section and the pane;

FIG. 6 is a perspective view of a container wherein the tubular section has two windows; and FIG. 7 is a perspective view of a container whose tubular section has three windows.

DESCRIPTION OF THE PREFERRED EMBODIMENTS

Referring first to FIG. 1, there is shown an upright container having a tubular section 1 (preferably a cylindrical barrel made of suitable synthetic plastic material which is assumed to be opaque), a bottom wall or end wall 2 which is releasably connected with the lower end portion of the barrel 1 by a ring-shaped clamp 3, and a cover or lid 4 which is releasably connected to the upper end portion of the barrel 1 to normally close and/or seal an opening for evacuation or withdrawal of the contents of the container. Such contents may include a plastic reel for a supply of convoluted thin wire which can be withdrawn via opening in the upper end portion of the barrel 1. The upper end portion of the barrel 1 has a cylindrical stacking collar 5 at least a portion of which can enter a complementary socket in the bottom wall or end wall 2 of a neighboring container, not shown. The reel can be inserted into the interior of the barrel 1 upon detachment of the wall 2 which is thereupon connected with the lower end portion of the barrel by the clamp 3. The reel remains in the interior of the container during withdrawal of the wire, i.e., upon detachment of the cover or lid 4.

In order to allow for immediate inspection of the contents of the barrel 1, the latter is provided with a circular window 6 (see FIG. 1) bounded by the edge face 106 of the barrel 1 (see FIG. 2). The cylindrical inner and outer surfaces of the barrel 1 are respectively shown at 9 and 11. The window 6 is closed by a pane 7 which consists of light-transmitting (transparent or translucent) synthetic plastic material and has an inner surface 8 flush with the inner surface 9 of the barrel 1, an outer surface 10 preferably flush with the outer surface 11 of the barrel 1, and a circumferentially extending edge face 107 between the surfaces 8 and 10. The edge faces 106 and 107 have complementary female and male portions which connect the pane 7 to the barrel 1. In the embodiment of FIGS. 1 and 2, the female portion of the edge face 106 has a circumferentially complete ring-shaped groove 206 which is located substantially midway between the surfaces 9 and 11, and the male portion of the edge face 107 is a circumferentially complete tongue 12 which is snugly received in the groove 206. Since the tongue 12 is located substantially midway between the surfaces 9 and 11, it is surrounded by plastic material of the barrel 1 at three sides. The embedding of the pane 7 in the window 6 can take place during injection molding or another procedure which is restored to for the making of the barrel 1. This insures that the tongue 12 is a tight fit in the groove 206 and remains in the groove even if the barrel 1 is subjected to pronounced deforming stresses, e.g., while the container of FIG. 1 is located below one or more containers which, together with the illustrated container, form an upright stack.

The groove 206 and the tongue 12 need not be circumferentially complete, i.e., it may suffice to provide the pane 7 with several circumferentially spaced arcuate tongues which extend into complementary arcuate grooves in the edge face 106 of the barrel 1.

FIG. 3 shows a portion of a tubular section or barrel 1a having an edge face 106a which defines a circumferentially complete groove 206a of triangular cross-sectional outline for the complementary tongue 13 of the pane 7a. The inner and outer surfaces of the pane 7a are respectively flush with the inner and outer surfaces of the barrel 1a.

The barrel 1b of FIG. 4 has an edge face 106b with a tongue 14 of triangular cross-sectional outline. The tongue 14 is snugly received in the complementary groove 207a of the edge face 107a of the light-transmitting plastic pane 7b. In contrast to the tongue 13 of FIG. 3, the tongue 14 of FIG. 4 is spaced apart from the inner and outer surfaces of the barrel 1b.

The pane 7c of FIG. 5 consists of light-transmitting plastic material and its edge face 107c has a circumferentially complete or interrupted tongue 15 provided with apertures 16 for portions of the barrel 1c. The edge face 106c of the barrel 1c has a complementary groove 206c for the tongue 15. When the barrel 1c is formed, e.g., in an injection molding machine, its material fills the apertures 16 to provide a permanent bond between the barrel and the tongue 15. This further insures that the pane 7c in the window of the barrel 1c cannot be expelled in response to deformation of the barrel, e.g., during stacking of containers which embody the features of FIG. 5 or during stacking of such containers with containers of the type shown in FIGS. 1-2, 3 and/or 4.

The window and the pane need not have a circular shape, i.e., it is equally possible to provide the barrel with one or more windows having an oval, triangular, square, kidney-shaped, rectangular or other polygonal outline. For example, FIG. 6 shows a container having a barrel 1d which has two substantially elliptical windows 17, 18 for complementary panes 7d. Of course, the panes and windows have similar complementary male and female portions as those shown in FIGS. 2 through 5. The two panes are integrally connected to each other by an elongated web or strip 19 which is recessed or embedded into the plastic material of the barrel 1d. The windows 17, 18 are disposed at different levels and the lower window 18 is nearer to the bottom wall or end wall 2d than to upper end portion of the barrel 1d. The same applies for the window 6 of FIG 1. The web 19 enhances the stability of the container and facilitates the insertion of panes 7d into the mold during the making of the barrel 1d.

The container of FIG. 7 has a barrel 1e with three windows 20, 21, 22 which have a substantially elliptical or oval outline and form a row adjacent to the bottom wall or end wall 2e. The panes 7e in the neighboring windows are connected to each other by webs 23, 24. These webs are recessed or embedded into the material of the barrel 1e.

The mounting of panes in the respective windows in such a way that the inner surfaces of the panes are flush with the inner surfaces of the respective barrels is desirable and advantageous because the wire cannot be engaged and broken by the pane or panes during withdrawal through the opening in the upper end portion of the barrel. Thus, the convolutions of wire which may move radially outwardly from the reel in the interior of the container can slide along the inner surface of the barrel and/or pane or panes without being caught by the pane or panes. The danger of breakage is especially pronounced when the diameter of convoluted wire is very small and/or when the wire is withdrawn at a high speed.

An advantage of a tight fit of the male portion or portions of the edge face of the pane or barrel in the complementary female portion of the other edge face is that the pane remains in the optimum position, even if the container which embodies one or more panes is located at the bottom of a relatively high stack. As stated above, such stacking can result in at least some elastic deformation of each lower container or of the lowermost container of a stack. Furthermore, the aforedescribed connection between each pane and the respective barrel insures that the pane or panes remain in optimum positions so as to preferably seal the respective window or windows when the container is subjected to stresses other than those arising as a result of stacking.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended wihin the meaning and range of equivalence of the claims.

I claim:

1. A container, particularly for storage and/or shipment of thin wire therein which is convoluted on a plastic reel or the like, comprising an end wall; a tubular section of synthetic plastic material including an end portion connected with said end wall, said section comprising a solid unitary wall and having an inner surface and an outer surface unitarily connected, at least two window openings extending between said surfaces and a peripheral edge face bounding each one of said window openings; and a viewing element including at least two transparent or translucent panes each installed in one of said window openings and each having an inner pane surface, an outer pane surface and a circumferentially extending edge face between the inner and outer surfaces, said pane surfaces of each of said panes being flush with the respective surface of said tubular section and the edge faces of said window openings and said panes having complementary male and female portions received within each other and connecting said panes to said tubular section, and a web integral with and interconnecting said panes and embedded within said tubular section and being of a smaller width than said panes.

2. The container of claim 1, wherein said male and female portions constitute at least one tongue-and-groove joint.

3. The container of claim 2, wherein said female portion is a groove in the respective edge face of said tubular section and said male portion is a tongue provided on the edge face of the respective pane and snugly received in said groove.

4. The container of claim 3, wherein said tongue has at least one aperture and said tubular section has a portion extending into said aperture.

5. The container of claim 1, wherein said web is fully embedded between said inner surface and said outer surface of said tubular section.

6. The container of claim 1, wherein said panes consist of synthetic plastic material.

7. The container of claim 1, wherein said tubular section has a second end portion and at least one window opening is nearer to said end wall than to said second end portion.

* * * * *